(12) United States Patent
Chien

(10) Patent No.: US 8,117,718 B2
(45) Date of Patent: Feb. 21, 2012

(54) LOCKING MECHANISM

(75) Inventor: Po-Yuen Chien, Sinjhuang (TW)

(73) Assignee: Jarllytec Co., Ltd., Taipei County (TW)

( * ) Notice: Subject to any disclaimer, the term of this patent is extended or adjusted under 35 U.S.C. 154(b) by 378 days.

(21) Appl. No.: 12/248,949

(22) Filed: Oct. 10, 2008

(65) Prior Publication Data

US 2009/0119872 A1 May 14, 2009

(30) Foreign Application Priority Data

Nov. 9, 2007 (TW) .............................. 96142640 A

(51) Int. Cl.
*E05D 11/10* (2006.01)
(52) U.S. Cl. ............................... 16/330; 16/325; 16/341
(58) Field of Classification Search .................... 16/244, 16/273, 274, 284, 296, 303, 312, 317, 325, 16/340, 341, 337, 330, 327
See application file for complete search history.

(56) References Cited

U.S. PATENT DOCUMENTS

| | | | | |
|---|---|---|---|---|
| 7,007,345 B2* | 3/2006 | Nakase et al. | .................. | 16/330 |
| 7,603,747 B2* | 10/2009 | Ho et al. | .......................... | 16/330 |
| 7,685,679 B2* | 3/2010 | Horng | .............................. | 16/330 |
| 7,870,644 B2* | 1/2011 | Chang | .............................. | 16/337 |
| 2007/0169312 A1* | 7/2007 | Ho et al. | ........................ | 16/330 |
| 2008/0141492 A1* | 6/2008 | Lin | ................................. | 16/330 |
| 2009/0064459 A1* | 3/2009 | Chang | .............................. | 16/321 |
| 2009/0158556 A1* | 6/2009 | Chang et al. | .................... | 16/330 |
| 2009/0320238 A1* | 12/2009 | Chiang | ............................. | 16/221 |
| 2009/0320243 A1* | 12/2009 | Wang et al. | ..................... | 16/303 |

* cited by examiner

*Primary Examiner* — Victor Batson
*Assistant Examiner* — Emily Morgan
(74) *Attorney, Agent, or Firm* — Guice Patents PLLC

(57) ABSTRACT

The present invention discloses a locking mechanism having a locking member disposed with a fan-shape protrusion and a fan-shape notch, such that when the locking member is rotating, the jerk as a result of rotation can be reduced, and when the locking member is returned to its original position, a sufficient torsion can still be generated. Also, when the locking member is in the locking position, the fan-shape protrusions are positioned at the fan-shape notches.

5 Claims, 5 Drawing Sheets

LOCKING MECHANISM

FIELD OF THE INVENTION

The present invention relates to a locking mechanism and in particular to a locking mechanism for a spindle.

BACKGROUND OF THE INVENTION

"Laborsaving Cam Wheel Structure," developed by the present inventor and disclosed in the ROC Patent No. M297612 on Sep. 11, 2006, is formed of a fixed member and a movable member abutted against and having an axle hole a mounting hole, respectively. The fixed member and movable member each has two slopes spirally running in reversed directions on the respective inner side, such that each slope has a peak end an adjacent root end. The peak and root ends of the fixed member are respectively abutted against those of the movable member such that when one of the two members rotates, the two peak ends move along the corresponding slope of the neighboring member from the peak to root ends.

However, there is room for improvement to avoid the jerk during the rotation between 150 to 180 degrees.

SUMMARY OF THE INVENTION

The primary object of the present invention is to provide a locking mechanism to avoid a jerk occurring between 150 to 180 degrees. The advantage provided by the present invention lies in the fact that no jerk occurs when the locking member rotates from 150 to 180 degrees, and when the locking member returns to its original position, between 30 to 60 degrees, a sufficient torsion can still be generated.

A locking mechanism used in a spindle according to one preferred embodiment of the present invention comprises:

a first locking member insertingly disposed on the spindle; and a second locking member socketingly retained onto and jointly rotated with the spindle; wherein the first locking member has a pair of fan-shape notches, whose ends are positioned at the same side; the second locking member has a pair of fan-shape protrusions, whose ends are positioned at the same side; consequently, when the second locking member is in the locking position, the fan-shape protrusions are positioned at the fan-shape notches; wherein the front ends of the fan-shape notches are formed to have a first slope, respectively, and the rear ends of the fan-shape notches are formed to have a second slope, respectively; wherein the first slopes of the fan-shape notches are formed an arc protrusion, respectively; wherein the second slopes of the fan-shape notches are formed an arc protrusion, respectively; wherein the front ends of the fan-shape protrusions are formed to have a first slope, respectively, and the rear ends of the fan-shape protrusions are formed to have a second slope, respectively; wherein the second locking member is formed to have planar faces between the fan-shape notches with the planar faces being formed to have oil grooves, and inclines may be further formed between the fan-shape notches and the planar faces.

A locking mechanism used in a spindle according to a further preferred embodiment of the present invention comprises:

a first locking member insertingly disposed on the spindle and having a first fan-shape notch, whose front end is formed to have a first slope, and a second fan-shape notch, whose rear end is formed to have a second slope, the ends of the fan-shape notches being located at the same side;

a second locking member socketingly retained onto and jointly rotated with the spindle, and having a first fan-shape protrusion, whose front end is formed to have a first slope, and a second fan-shape protrusion, whose rear end is formed to have a second slope, the ends of the fan-shape protrusions being located at the same side; wherein when the second locking member is in the locking position, the fan-shape protrusions are positioned at the fan-shape notches.

BRIEF DESCRIPTION OF THE DRAWINGS

The present invention can be more fully understood by reference to the following description and accompanying drawings, in which.

DETAILED DESCRIPTION OF THE INVENTION

Figure 1:
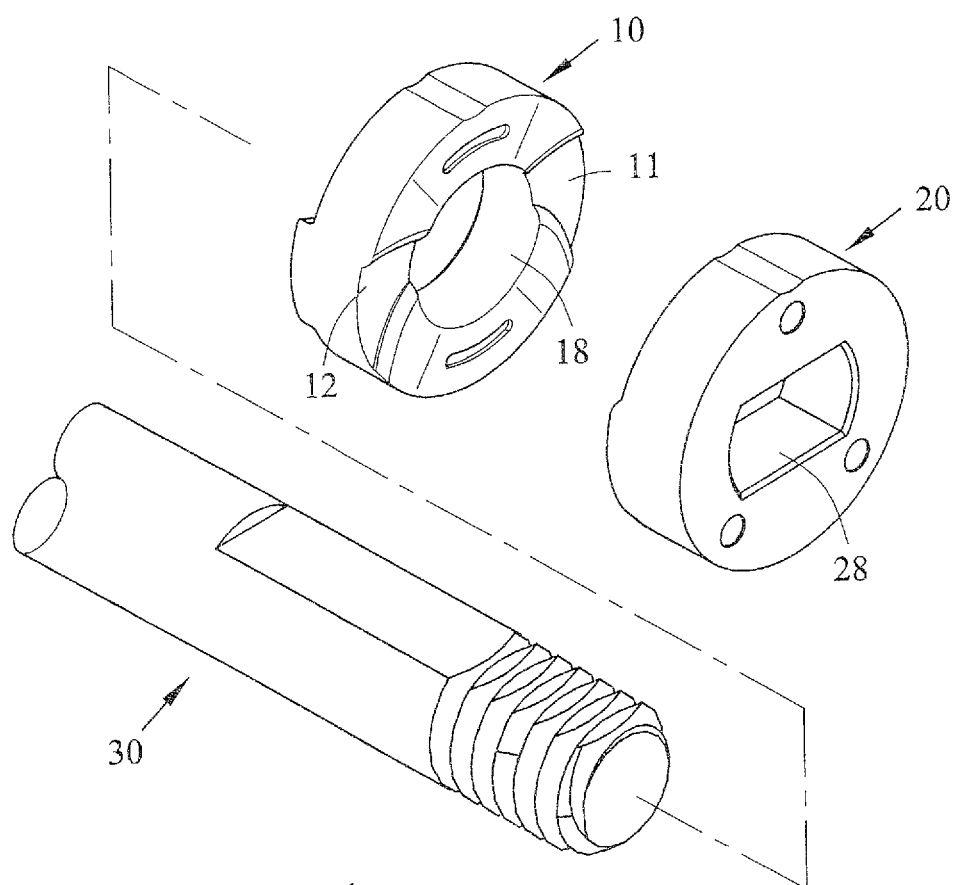
FIG. 1 is an exploded perspective view according to one preferred embodiment of the present invention.
Figure 2:
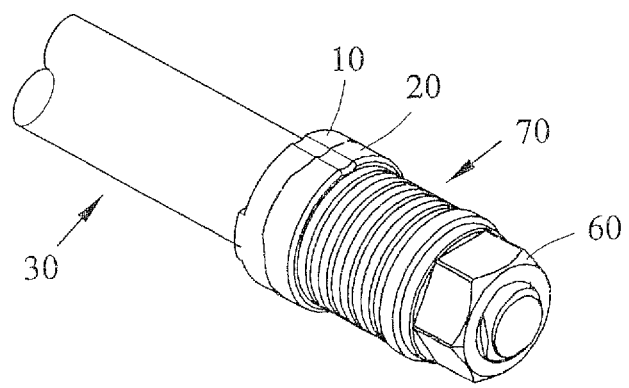
FIG. 2 is a perspective assembly view according to one preferred embodiment of the present invention.
Figure 3:
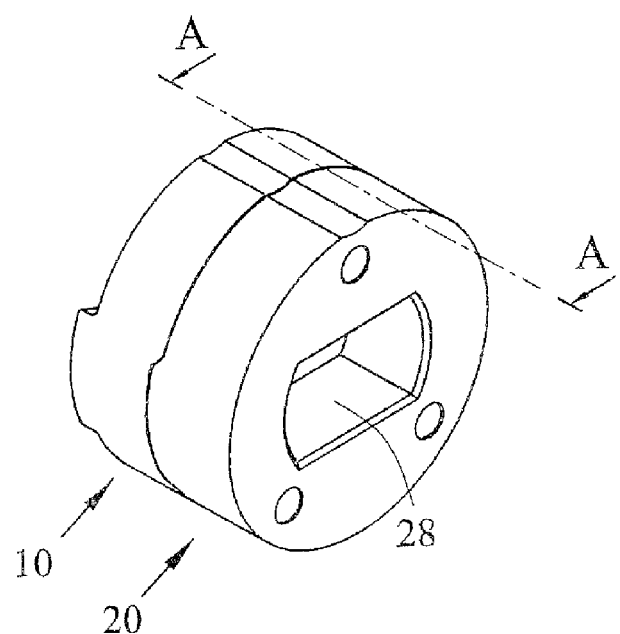
FIG. 3 is a perspective view of a locking member according to one preferred embodiment of the present invention.
Figure 4:
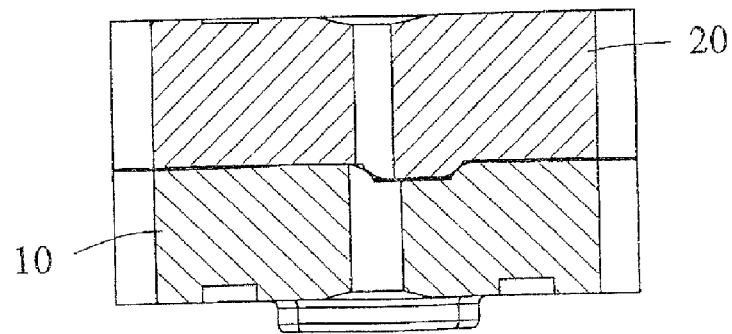
FIG. 4 is the cross-sectional view taken through the A-A line in FIG. 3.

With reference to FIGS. 1 to 8, one preferred embodiment of a locking mechanism according to the present invention disposed on a spindle 30 comprises:

a first locking member 10 having a through hole 18 which is inserted into the spindle 30 and a second locking member 20 having a retaining hole 28 which is socketingly retained onto and jointly rotated with the spindle 30; wherein the first locking member 10 has a first fan-shape notch 11 and a second fan-shape notch 12, whose ends 110 and 120 are positioned at the same side (the fan shape points to the same direction); the second locking member 20 has a first fan-shape protrusion 21 and a second fan-shape protrusion 22, whose ends 210 and 220 are positioned at the same side (the fan shape points to the same direction).

To ensure the fitting of the first locking member 10 and the second locking member 20 as well as generate torsion with respect to the spindle 30, the end of the spindle 30 is socketingly connected with a resilient element 70, which is fastened with a nut 60; wherein the resilient element 70 may comprise a spring or a plurality of spring discs. If the resilient element 70 is a plurality of spring discs, which may have arc faces and alternately inserted in opposite faces at the end of the spindle 30.

When the second locking member 20 is in the locking position, the rotation angle of the second locking member 20 is "zero," and the first and second fan-shape protrusions 21, 22 are positioned at the first and second fan-shape notches 11, 12, respectively. When the second locking member 20 is to disengage from the locking position, the second locking member 20 may be jointly rotated with the spindle 30, the first and second fan-shape protrusions 21, 22 slide from the first and second fan-shape notches 11, 12 into two planar faces 13, 14 of the first locking member 10. The two planar faces 13, 14 are formed to have oil grooves 130, 140 to provide good lubrication.

When the second locking member 20 is rotated to the "180" degree from the locking position, since the fan-shape direction of the first fan-shape protrusion 21 is opposite to that of the second fan-shape notch 12, the first fan-shape protrusion 21 will not slip into the second fan-shape notch 12; furthermore, since the fan shape direction of the second fan-shape protrusion 22 is opposite to that of the first fan-shape notch 11, the second fan-shape protrusion 22 will not slip into the first fan-shape notch 11. Consequently, a locking mechanism according to the present invention has only one single locking position and no jerk will occur when the second locking member 20 rotates from 0 to 180 degrees. On the other hand, since the protrusions and notches of conventional art are designed in a symmetrical fashion, the protrusions will slip downward into the fan-shape notches at around 150 degree. Thus, a conventional locking member will experience a jerk between 150 to 180 degrees.

Figure 5:
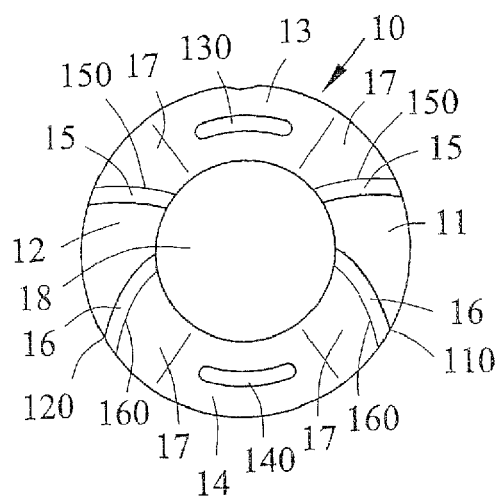
FIG. 5 is a plane view of a first locking member according to one preferred embodiment of the present invention.
Figure 6:
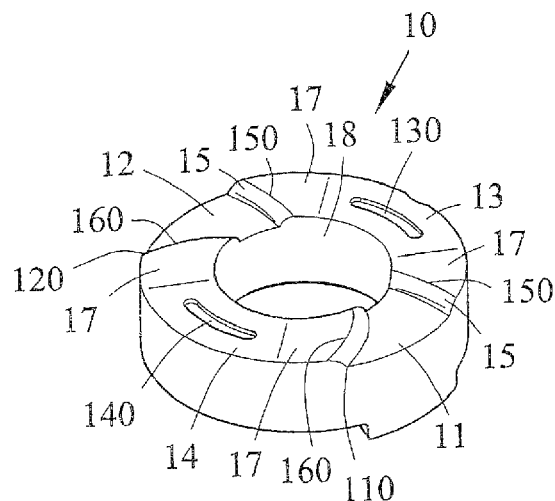
FIG. 6 is a perspective view of a first locking member according to one preferred embodiment of the present invention.

With reference to FIGS. 5 and 6, the front ends of the first and second fan-shape notches 11, 12 are formed to have a first slope 15, respectively, and the rear ends of the first and second fan-shape notches 11, 12 are formed to have a second slope 16, respectively, so as to enhance the rotation smoothness of the second locking member 20. Also, an incline 17 is further formed between the first and second fan-shape notches 11, 12 and the two planar faces 13, 14, respectively. Both the first arc shaped notch 11 and the second arc shaped notch 12 of the first locking member 10 have a first curved end (adjacent to the first slope 15) and a second curved end (adjacent to the second slope 16).

Moreover, the first slopes 15 of the first and second fan-shape notches 11, 12 may be formed to have an arc protrusion 150, respectively, and the second slopes 16 of the first and second fan-shape notches 11, 12 may be formed to have an arc protrusion 160, respectively, such that when the first and second protrusions 21, 22 pass through the arc protrusions 150, 160, the torsion generated from the resilient element 70 with respect to the spindle 30 can be enhanced. In particular, when the second locking member 20 is rotated back to its original position, between 30 to 60 degrees, a sufficient torsion can still be generated.

Figure 7:
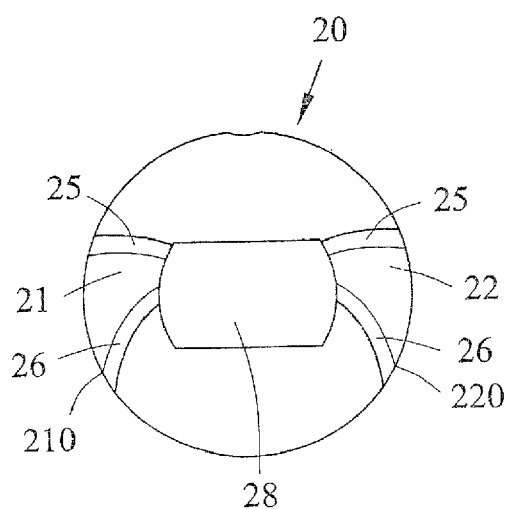
FIG. 7 is a plane view of a second locking member according to one preferred embodiment of the present invention.
Figure 8:
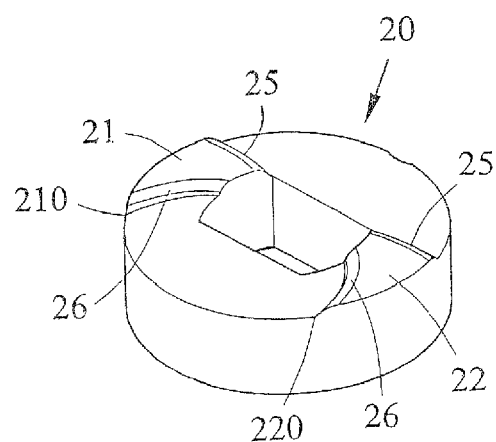
FIG. 8 is a perspective view of a second locking member according to one preferred embodiment of the present invention.

With reference to FIGS. 7 and 8, the front ends of the first and second fan-shape protrusions 21, 22 are formed to have a first slope 25, respectively, and the rear ends of the first and second fan-shape protrusions 21, 22 is formed to have a second slope 26, respectively, to enhance the rotation smoothness of the second locking member 20. Both the first arc shaped protrusion 21 and the second arc shaped protrusion 22 of the second locking member 20 have a first curved end (adjacent to the first slope 25) and a second curved end (adjacent to the second slope 26).

Figure 9:
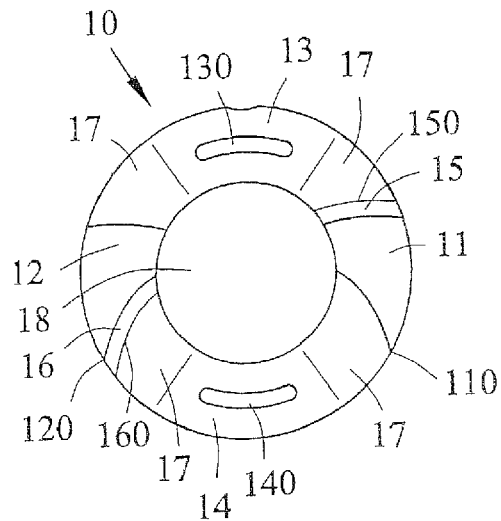
FIG. 9 is a plane view of a first locking member according to the second embodiment of the present invention.
Figure 10:
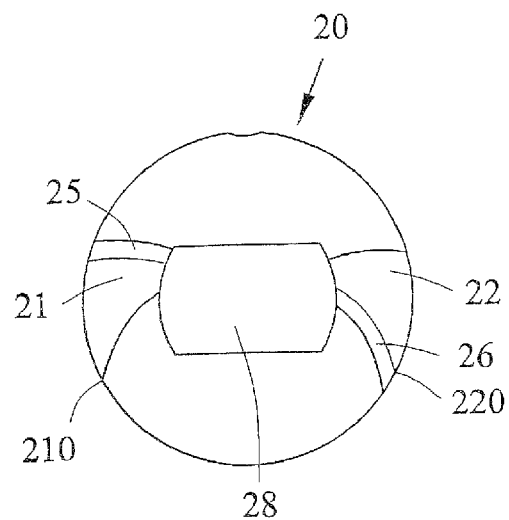
FIG. 10 is a plane view of a second locking member according to the second embodiment of the present invention.

With reference to FIGS. 9 and 10, the second embodiment of a locking mechanism according to the present invention may modify the preferred embodiment such that the front end of the first fan-shape notch 11 is formed to have a first slope 15 and the rear end of the second fan-shape notch 12 is formed to have a second slope 16; the front end of the first fan-shape protrusion 21 is formed to have a first slope 25 and the rear end of the second fan-shape protrusion 22 is formed to have a second slope 26; wherein the first slope 15 of the first fan-shape notch 11 is formed to have an arc protrusion 150 and the second slope 16 of the second fan-shape notch 12 is formed to have an arc protrusion 160, which can also be an embodiment of a locking mechanism according to the present invention.

Figure 11:
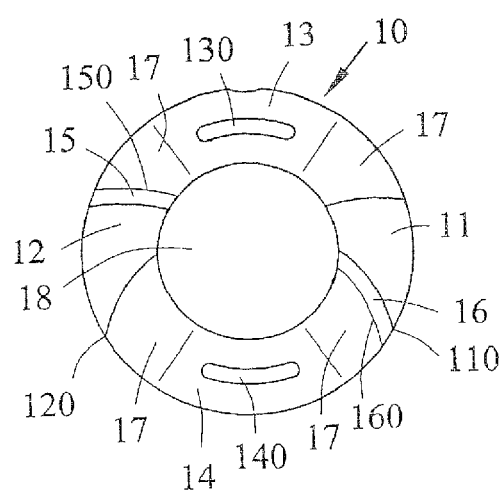
FIG. 11 is a plane view of a first locking member according to the third embodiment of the present invention.
Figure 12:
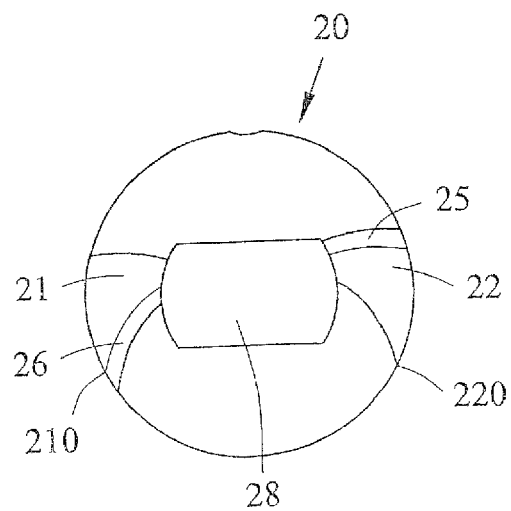
FIG. 12 is a plane view of a second locking member according to the third embodiment of the present invention.

With reference to FIGS. 11 and 12, the third embodiment of a locking mechanism according to the present invention may modify the preferred embodiment such that the front end of the second fan-shape notch 12 is formed to have a first slope 15 and the rear end of the first fan-shape notch 11 is formed to have a second slope 16; the front end of the second fan-shape protrusion 22 is formed to have a first slope 25 and the rear end of the first fan-shape protrusion 21 is formed to have a second slope 26; wherein the first slope 15 of the second fan-shape notch 12 is formed to have an arc protrusion 150, and the second slope 16 of the first fan-shape notch 11 is formed to have an arc protrusion 160, which can also be an embodiment of a locking mechanism according to the present invention.

Figure 13:
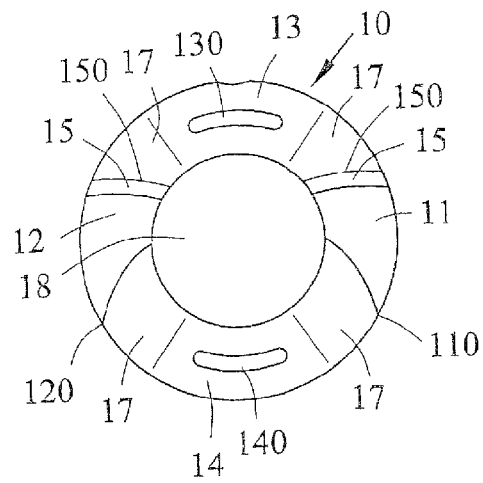
FIG. 13 is a plane view of a first locking member according to the fourth embodiment of the present invention.
Figure 14:
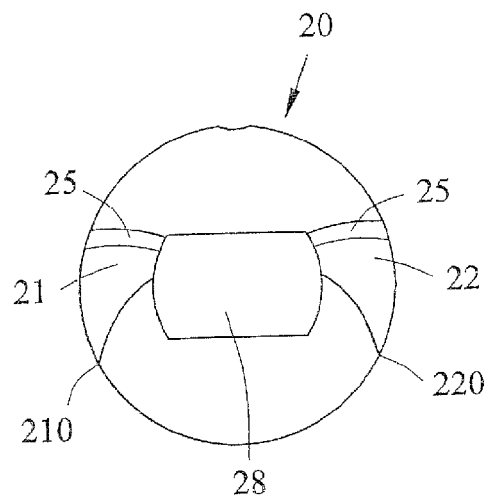
FIG. 14 is a plane view of a second locking member according to the fourth embodiment of the present invention.

With reference to FIGS. 13 and 14, the fourth embodiment of a locking mechanism according to the present invention may modify the preferred embodiment such that the front ends of the first and second fan-shape notches 11, 12 are formed to have a first slope 15, respectively; the front ends of the first and second fan-shape protrusions 21, 22 are formed to have a first slope 25, respectively; and the ends of the first and second fan-shape protrusions 21, 22 are positioned at the same side; wherein the first slopes 15 of the first and second fan-shape notches 11, 12 may be formed to have an arc protrusion 150, respectively.

Figure 15:
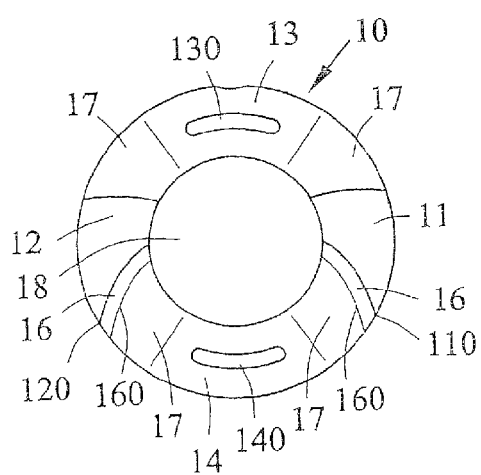
FIG. 15 is a plane view of a first locking member according to the fifth embodiment of the present invention.
Figure 16:
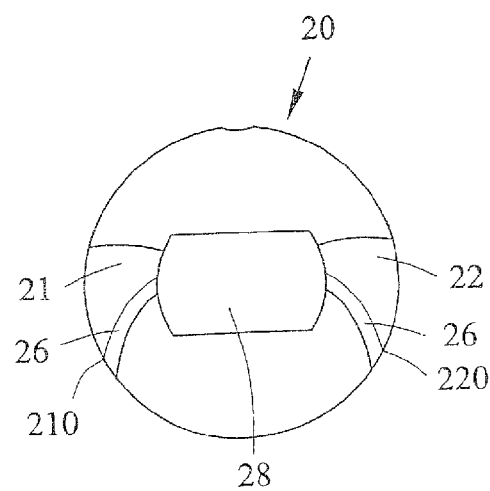
FIG. 16 is a plane view of a second locking member according to the fifth embodiment of the present invention.

With reference to FIGS. 15 and 16, the fifth embodiment of a locking mechanism according to the present invention may modify the preferred embodiment such that the rear ends of the first and second fan-shape notches 11, 12 are formed to have a second slope 16, respectively, and the rear ends of the first and second fan-shape protrusions 21, 22 are formed to have a second slope 26, respectively; wherein the second slope 16 of the first fan-shape notch 11 may be formed to have an arc protrusion 160, and the second slope 16 of the second fan-shape notch 12 may be formed to have an arc protrusion 160.

Consequently, by putting the present invention into practice, while the invention has been described with reference to the a preferred embodiment thereof, it is to be understood that modifications or variations may be easily made without departing from the spirit of this invention, which is defined by the appended claims.

What is claimed is:

1. A locking mechanism used in a spindle comprises:
a first locking member insertingly disposed on the spindle; and
a second locking member socketingly retained onto and jointly rotated with the spindle;
wherein the first locking member has a pair of arc shaped notches including a first arc shaped notch and a second arc shaped notch, both of the first arc shaped notch and the second arc shaped notch of the first locking member have a front curved end and a rear curved end; the second locking member has a pair of arc shaped protrusions including a first arc shaped protrusion and a second arc shaped protrusion, both of the first arc shaped protrusion and the second arc shaped protrusion of the second locking member have a front curved end and a rear curved end;

wherein front curved ends of the arc shaped notches are formed to have a first sloped surface, respectively, and rear curved ends of the arc shaped notches are formed to have a second sloped surface, respectively;

wherein the first sloped surfaces of the arc shaped notches are an arc protrusion having an arc shape, respectively;

wherein the second sloped surfaces of the arc shaped notches are an arc protrusion having an arc shape, respectively;

wherein, when the second locking member is located in a single locking position, the first arc shaped protrusion is located in the first arc shaped notch and the second arc shaped protrusion is located in the second arc shaped notch;

wherein the arc shape of the pair of arc shaped notches and the arc shape of the pair of arc shaped protrusions prevent the first arc shaped protrusion from being inserted into the second arc shaped notch and the second arc shaped protrusion from being inserted into the first arc shaped notch, the second locking member is only lockable in the single locking position.

2. The locking mechanism as defined in claim 1, wherein front curved ends of the arc shaped protrusions are formed to have a first sloped surface, respectively, and rear curved ends of the arc shaped protrusions are formed to have a second sloped surface, respectively.

3. The locking mechanism as defined in claim 1, wherein the first locking member is formed to have planar faces between the arc shaped notches with the planar faces being formed to have oil grooves, and inclines are further formed between the arc shaped notches and the planar faces.

4. The locking mechanism as defined in claim 1, wherein the pair of arc shaped notches of the first locking member extend from an interior wall of a through hole of the first locking member to an exterior wall of the first locking member and communicate with the interior wall of the through hole of the first locking member and the exterior wall of the first locking member; and the pair of arc shaped protrusions of the second locking member extend from an interior wall of a retaining hole of the second locking member to an exterior wall of the second locking member and communicate with the interior wall of the retaining hole and the exterior wall of the second locking member.

5. The locking mechanism as defined in claim 1, wherein the first arc shaped protrusion of the second locking member has an arc shape radiating outwardly in a direction opposite to a direction of an arc shape of the second arc shaped protrusion of the second locking member.

\* \* \* \* \*